(12) United States Patent
Dougherty et al.

(10) Patent No.: US 10,198,736 B2
(45) Date of Patent: *Feb. 5, 2019

(54) PERSONALIZING DIGITAL GIFTS

(71) Applicant: Apple Inc., Cupertino, CA (US)

(72) Inventors: Casey Maureen Dougherty, San Francisco, CA (US); Melissa Breglio Hajj, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/946,613

(22) Filed: Apr. 5, 2018

(65) Prior Publication Data

US 2018/0225679 A1 Aug. 9, 2018

Related U.S. Application Data

(63) Continuation of application No. 13/450,419, filed on Apr. 18, 2012, now Pat. No. 9,940,629.

(51) Int. Cl.
| | | |
|---|---|---|
| *G06Q 30/00* | (2012.01) | |
| *G06Q 30/02* | (2012.01) | |
| *G06Q 30/06* | (2012.01) | |
| *G06Q 50/00* | (2012.01) | |

(52) U.S. Cl.
CPC ......... *G06Q 30/02* (2013.01); *G06Q 30/0621* (2013.01); *G06Q 50/01* (2013.01)

(58) Field of Classification Search
CPC .............. G06Q 30/00; G06Q 30/0601; G06Q 30/0621; G06Q 20/123
USPC .............................................. 705/26.1, 27.1
See application file for complete search history.

(56) References Cited

U.S. PATENT DOCUMENTS

| | | |
|---|---|---|
| 7,933,810 B2 | 4/2011 | Morgenstern |
| 2008/0189189 A1 | 8/2008 | Morgenstern |
| 2009/0112359 A1 | 4/2009 | Sanguinetti |
| 2010/0082489 A1 | 4/2010 | Lin et al. |
| 2010/0223314 A1 | 9/2010 | Gadel et al. |
| 2013/0232221 A1 | 9/2013 | Brechner et al. |
| 2013/0246524 A1 | 9/2013 | Berner et al. |

FOREIGN PATENT DOCUMENTS

| | | |
|---|---|---|
| WO | 20110151678 | 12/2011 |
| WO | 2012012894 | 2/2012 |
| WO | 2012016032 | 2/2012 |

OTHER PUBLICATIONS

Unknown author, "Moblyng Allows Consumers to Instantly Mobilize Social Media Content," Business Wire, May 21, 2008.

*Primary Examiner* — Brandy A Zukanovich
(74) *Attorney, Agent, or Firm* — Polsinelli PC

(57) ABSTRACT

Disclosed herein are systems, methods, and non-transitory computer-readable storage media for gifting and personalizing a digital media item, particularly an electronic book. A system is described that includes personalizing a digital media item that is to be gifted from a first person to one or more people. The digital media item can be personalized using a segment of the digital media item that the first person associated with the second person. Depending on the second person's response, the gift can be accepted, rejected, or re-gifted. News of the second person's response can be automatically transmitted to a plurality of social networking services.

24 Claims, 13 Drawing Sheets

PERSONALIZING DIGITAL GIFTS

CROSS-REFERENCE TO RELATED APPLICATIONS

This application is a Continuation of U.S. patent application Ser. No. 13/450,419, filed on Apr. 18, 2012, entitled "Personalizing Digital Gifts," which is expressly incorporated by reference herein in its entirety.

BACKGROUND

Technical Field

The present disclosure relates generally to gifting and more specifically to techniques and systems for personalizing digital gifts available on an online store.

Introduction

In recent years, electronic devices capable of playing digital media items such as digital eBooks, digital audio files, and digital video files have become common in every household. These devices, which include laptop computers, handheld digital media players, smart phones, and handheld gaming systems, appeal to a wide demographic and are used daily. As a result of the growing popularity these electronic devices, the sales of digital content have also grown dramatically.

With the proliferation of digital content and digital content players, users have begun to expect more out of their digital content. This has created a demand for diverse content such that everyone is able to find some content that appeals to them. For example, digital books on childcare are available for first time mothers and the newest music is available for young adults. There has also been a demand for new ways to interact with the digital content, thus improving the user experience. For example, some electronic books are interactive, thus allowing a user to interact with the book in a manner that was not possible with a traditional book. Similarly, some digital songs contain metadata such as the lyrics of the song, thus allowing a user to conveniently gain access to the lyrics when listening to the song.

Other improvements have also included the ability to gift digital content to another. For example, one user can select a song from an online store and gift the song to another user. While there have been many advancements in the use and distribution of digital content, there is still a need for improved techniques for personalizing gifts of digital content.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for gifting and personalizing digital media. The digital media includes electronic books (eBooks), audio songs, videos, movies, and other digital media content. As a user enjoys a digital media item that is being processed by an electronic device, the user can come across a section, segment, or portion of the digital media item that appeals to the user. The appeal can be, e.g., that the segment touches the user, the segment reminds the user of a past experience, the user associates the segment with another user, etc. Due to the appeal, the user may wish to gift the digital media item to another. To gift the digital media item, the user can trigger a gifting event by selecting the segment of the digital media item that is appealing and, using a menu or touch interface of an electronic device, select to gift the digital media item to another party. The recipient can be specified using a name, account ID, or other identification. Triggering of the gifting event can initiate the execution of a process of electronic device that results in the transmission of a notification to an online store that manages digital media libraries belonging to users. In other examples, a gift can be processed directly on the online store. For instance, a user can log into an online store configured to sell and manage digital media items or digital media subscriptions. The user can interface with the online store by using a menu or touch interface on the user's electronic device to select the desired gift for the other party.

Upon receiving the notification that the gifting event has occurred, the online store can personalize a gifted digital media item for the recipient. The personalization can include the segment of the digital media item that appealed to the user. The user can incorporate the segment of the digital media item as part of a personal message that will be sent to the recipient to notify her of the gift. The user can also incorporate the segment of the digital media item as part of a personal message that is attached with the copy of the digital media item. That attached message can optionally be presented to the recipient before presentation of the copy of the digital media item.

Once the gifted digital media item has been personalized, the recipient can be notified of the available gift. The notification can be transmitted via a message to a device of the recipient, to an email of the recipient, or posted on the recipient's page of a social network website. The recipient can choose whether to accept, reject, or re-gift the gift. Depending on the recipient's choice, the gift can be added to the recipient's media library, deleted and credited back to the user, or added to a third party's media library. News of the recipient's choice can be broadcasted to multiple services or devices associated with the recipient.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for systems, techniques, and methods for personalizing a gift of digital media. The digital media can include electronic books (eBooks), digital audio tracks/albums, movies, videos, and other digital media content. While the disclosure focuses on personalizing gifts of eBooks and audio tracks, it is to be understood by a person of ordinary skill in the relevant art that these teachings can also be applied to other digital media items such as movies, photos, images, etc. As a user enjoys her copy of an eBook (or song, or other digital media) on an electronic device running a media player application, the user may run into a section or segment in the eBook that reminds her of a friend. This section or segment can be a passage, an excerpt, an image, a caption, or other part of the eBook that she associates with a friend. Since the segment reminds her of her friend, she can use the user interface of the media player application to gift the eBook to her friend, if she chooses to. By gifting an eBook, the reader would essentially pay a fee to own another copy of the book and specify the recipient of the gift. This is similar to traditional gifting, which involves purchasing an item and giving it to another. The gifted eBook can be personalized with a dedication page that contains the passage or section of the eBook that reminded the reader of her friend. In some examples, the dedication page can be presented to the friend as a default page every time the friend opens the eBook. In other examples, the eBook can be personalized with other metadata from the reader, such as the reader's bookmarks, notes, or highlights in the eBook.

Figure 1:
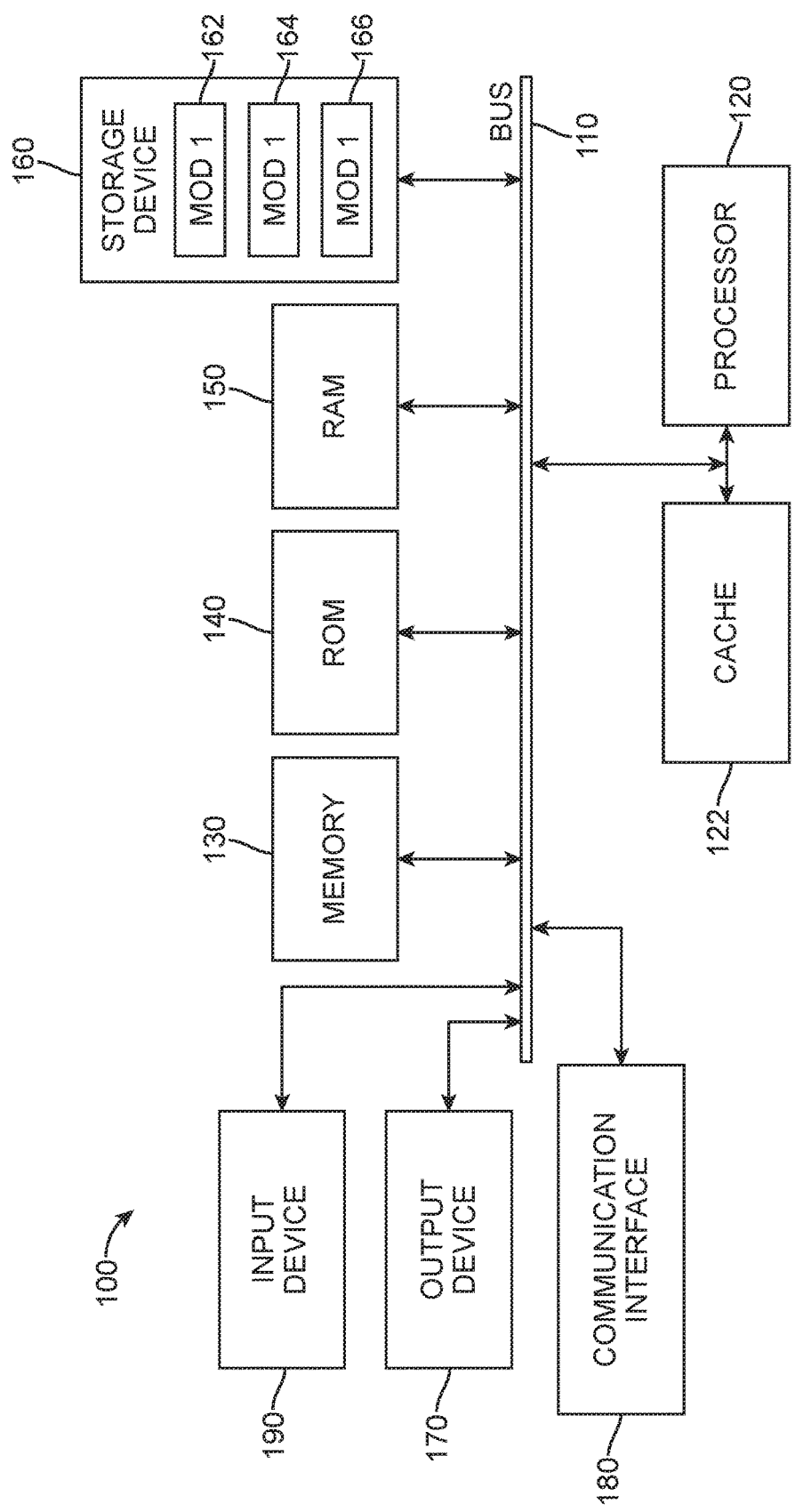
FIG. 1 illustrates an exemplary system embodiment.

After selecting her friend as the recipient of the gift, her friend is sent a notification that a gift has been received. This notification can come in the form of a text message, an instant message, a post on a social network, a tweet, or other message that is visible by her friend. The notification can also include the passage or section of the eBook that reminds the reader of her friend. This can serve as way for the reader and the friend to share a moment, more particularly the moment that was the catalyst of the gift. In some scenarios upon receiving the notification, her friend can choose to accept the gift or alternatively, re-gift the digital media item to a third party. A detailed discussion of the methods and systems surrounding the concept of gifting digital media items in provided below. First, a brief introductory description of a basic general purpose system or computing device which can be employed to practice the concepts is illustrated in FIG. 1. A detailed description of gifting techniques will follow. Several variations shall be discussed herein as the various embodiments are set forth. The disclosure now turns to FIG. 1.

General System

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, a solid state drive, a tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide non-volatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now turns to techniques and systems for gifting digital media items.

The Gifting System

Figure 2:
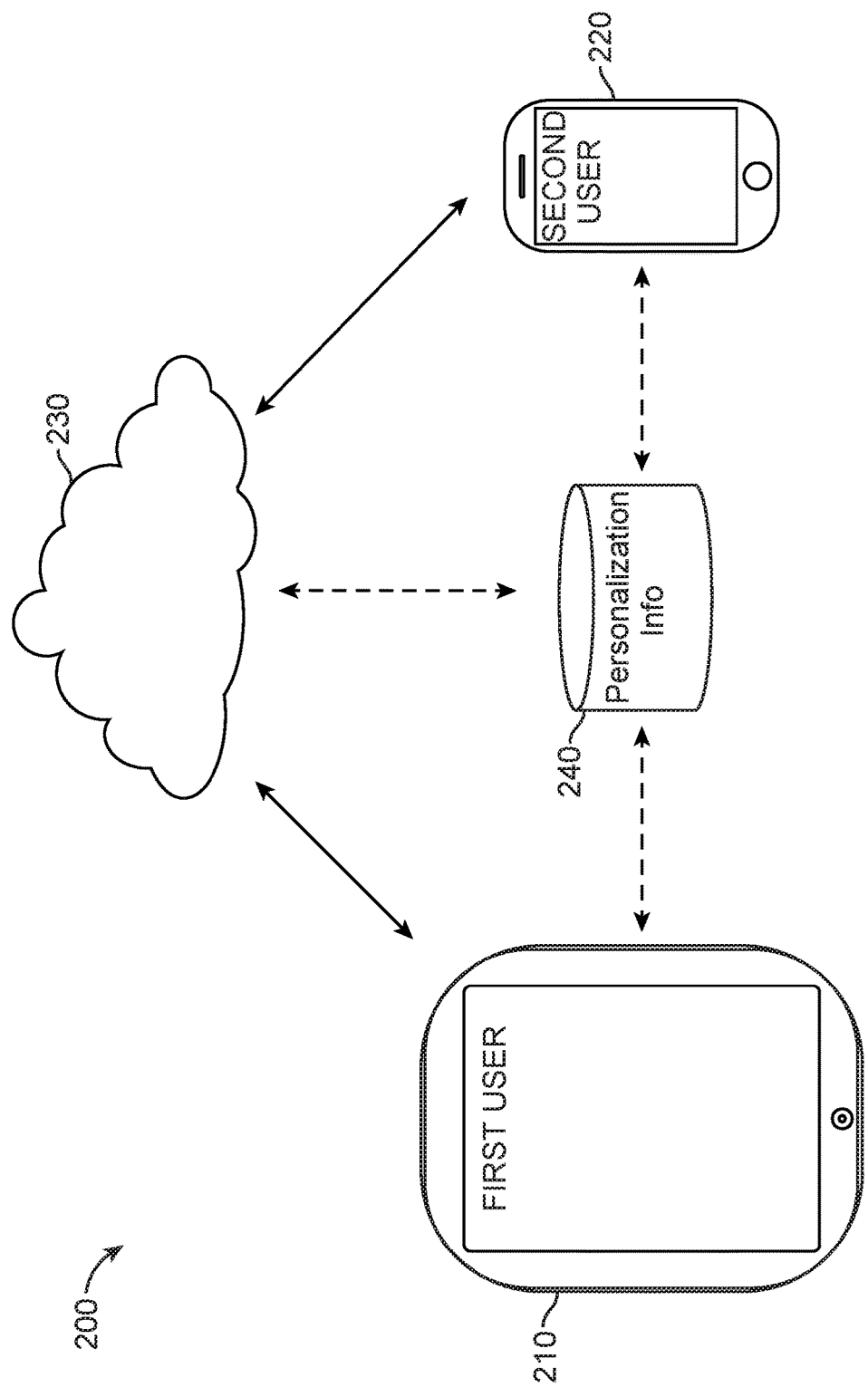
FIG. 2 illustrates an exemplary gifting system.

FIG. 2 illustrates an exemplary gifting system. Gifting system 200 includes electronic device 210 that is associated with a first user, electronic device 220 that is associated with a second user, and cloud 230. Electronic device 210 can include components typically found in electronic devices including a processor, a memory, a display, and a speaker. Electronic device 210 can further include a digital media item. The digital media item can be any digital media capable of being processed by electronic device 210. Examples of digital media items include eBooks, digital songs, movies, and other audio/visual digital media. Processing of the digital media item by electronic device 210 results in audio and/or visual signals being generated and outputted by electronic device 210 for the consumption and enjoyment by the first user.

As electronic device 210 processes the digital media item, the first user may come across a section, segment, passage, or portion of the digital media item that appeals to the first user. The segment can be text from an eBook, a time-bounded snippet from an audio track, an image from an eBook or album art, a time-bounded segment of a video file or other part of the digital media item. The digital media item can appeal to the first user for a variety of reasons. As an example, the digital media item may appeal to the first user because the first user owns other digital media items that are similar to the digital media item. As another example, the digital media item may appeal to the first user because the digital media item reminds the first user of a memorable past experience or encounter. In both these examples, the first user may wish to share the digital media item, and particularly this segment of the digital media item, with another person, such as a significant other, spouse, or friend. In other words, the first user may wish to share this experience, which in turn may create a new memorable experience, with another person. For example, a husband listening to a Top 100 songs playlist may come across a song that he performed when he was in college. The husband may select a snippet from the song that he sang and wish to share that snippet with his wife. By gifting a copy of this song and highlighting the snippet, the husband has shared a memorable experience in his life with his wife. As a result, this song may also carry a special meaning or memory with the wife or the husband and wife can create a new experience.

In other examples, the digital media item may appeal to the first user because the first user associates the digital media item or the segment of the digital media item with the second user. The first user may associate a digital media item with the second user because they have had a shared experience with the digital media item. In some instances, the shared experience may be more particular and deal specifically with a segment of the digital media item. For example, the first user and the second user may have gone to the same concert and shared their first kiss when the song was being performed. As a result, the first user may want to gift the song to the second user and remind the second user of that particular snippet from the song when the kiss took place. As another example, two friends may have both read a classic American novel during high school. Many years later, the first friend picks up the novel as an eBook and reads it again. While reading the eBook, the first friend comes across a passage that reminds the first friend of a discussion she had with the second friend in high school when they both read the book. As a result, the first friend may want to gift the eBook to the second friend and particularly point out the passage to remind the second friend of the discussion they had many years ago. The sharing of the passage between the two friends can reignite an old experience, thus renewing the old experience or alternatively creating new experiences between the two friends (e.g., future discussions over the same passage or other passages in the eBook).

The first user may also associate the digital media item with the second user because the first user has knowledge or believes that the second user would enjoy the digital media item, or more particularly a segment of the digital media item. The first user may gift the digital media item to the second user in hopes of creating a new experience with the second user. For example, the first user may know that the second user likes panda bears. While watching a nature video that includes a snippet of a baby panda bear feeding, the first user may wish to gift that video to the second user and particularly point out the snippet of the baby panda to the second user. As a result, the first user can gift the nature video to the second user and point the second user to that particular snippet. After the second user views that particular snippet, the first user and second user would have viewed the same snippet and thus can create new memorable experience based on the snippet. In another example, a first reader has knowledge that a second reader enjoys thoughtful quotes. While reading an eBook, the first reader comes across a quote in the eBook that the first reader believes the second reader would enjoy. The first reader can gift the eBook to the second reader and mention the quote. As a result, the first reader and the second reader can spark a discussion about the quote, thus create a new experience based on the quote or eBook. A new experience can also be created by the fact that both readers have read the same quote.

When a segment of a digital media item appeals to the first user, a predefined interaction event can be triggered on electronic device 210. The predefined interaction event is a predefined event that is triggered by user interaction on electronic device 210. For example, the predefined interaction event can be a first user providing input to electronic device 210 to instruct the device to gift the digital media item (e.g., gifting event). The predefined interaction event can also include the first user providing input to personalize the digital media item. Examples of predefined interaction events are described below in FIGS. 3-5.

In one embodiment where the digital media items are maintained by the electronic devices, electronic device 210 can purchase another copy of the digital media item in response to the predefined interaction event. For example, electronic device 210 can purchase the copy of the digital media item from an online store. The online store can be located on the internet. Electronic device 210 can personalize the copy of the digital media item and/or message for the recipient to notify the recipient of the gift. The personalization (which can be to the digital media item or to the message to the recipient) can include the segment of the digital media item selected by the first user. The segment may appeal to the first user. For example, the appeal can be that the first user associates the segment to a second user. In one example where the digital media item is an eBook, the personalization can include a dedication page to the second user that includes the segment of the eBook that the first user associates with the second user. The dedication page can be the default page that is displayed when the book is opened.

In another example, the personalization can include an email to the second user notifying the second user of the gift, where the email includes the section of the digital media item that reminds the first user of the second user or that the first user believes the second user would like. In other examples, the personalization can include attaching notes, highlights, bookmarks, or other metadata associated with the digital media item and created by the first user to the copy of the digital media item to be gifted to the second user. Once the copy of the digital media item and/or message for the second user has been personalized, electronic device 210 transmits the message to electronic device 220. The transmission can be through the internet, wired, or wireless communication (not shown). The message can include the copy of the digital media item. Electronic device 220 receives the message with the copy of the digital media item. The copy of the digital media item can now be stored and managed within electronic device 220.

In another embodiment, the digital media items are maintained using cloud computing. The digital media items owned by the different users of system 200 are managed by cloud 230 and communication between the electronic devices and cloud 230 is through cloud based applications running on the electronic devices. When the predefined interaction event has occurred on electronic device 210, electronic device 210 can transmit a notification to notify system 200 of this event. This can include transmitting the notification to cloud 230. In some examples, the notification can also include a segment of the digital media item selected by the first user. The segment may appeal to the first user. For example, the appeal can be that the first user associates the segment to a second user.

Cloud 230, which includes a server having a processor, receives the notification from electronic device 210. Cloud 230 processes the notification and generates a gifted digital media item. In one example, the gifted digital media item can be a copy of the digital media item. In another example the gifted digital media item can be a copy of the digital media item that has been personalized. Personalization of the copy of the digital media item can include the generation of a personal message that is associated with the copy of the digital media item. Personalization can also include associating one or more notes created by the first user to the copy of the digital media item. After generating the gifted digital media item, cloud 230 can notify the second user of the gifted digital media item. The notification can come in a message (e.g., email, text, messaging application such as iMessage™, push notification, etc.) transmitted to electronic device 220 from cloud 230. The information contained in the message can vary based upon implementation details. In one example, the message can inform the second user that the gifted digital media item has been associated with the second user's account if system 200 automatically associates the gifted digital media item after generation. In another example, the message can inform the second user that the gifted digital media item is available for redemption if system 200 is implemented such that the recipient has a choice of whether or not to redeem the gifted digital media item. After receiving the message, the second user can choose to not redeem the gifted digital media item (e.g., the second user is not interested in gifted digital media item). In one example, gifted digital media items that are not redeemed can be credited back to the first user so that the first user can receive a refund (full or partial) for the purchase of the copy. Alternatively, gifted digital items that are not redeemed can be re-gifted by the first user to another user. In another example, the second user can choose to not redeem the gifted digital media item and instead re-gift the gifted digital media item to another.

Cloud 230 can maintain a user account for each user in system 200. Each user account can include payment information, personal information of the user, and/or a list of digital media items that the user has the right to perform. In some examples, cloud 230 can store a master copy of each digital media item. When users purchase a copy of the digital media item, cloud 230 can grant a user account a subscription or right of use to the digital media item. Personalization metadata associated with each user's own copy (such as notes or a personal message) can be stored separately and combined with the master copy before the digital media item is presented to the user. This personalization metadata can be stored within personalization information database 240. In some examples, the personalization information database 240 can also store payment information, personal information of the user, and a list of digital media items that the user has a right to perform Personalization information database 240 can be accessible via cloud 230, electronic devices 210 and 220, or both. Depending upon implementation details, the personalization metadata may be passed between electronic device 210 and 220, or alternatively remain on cloud 230.

Predefined Interaction Event

Figure 3:
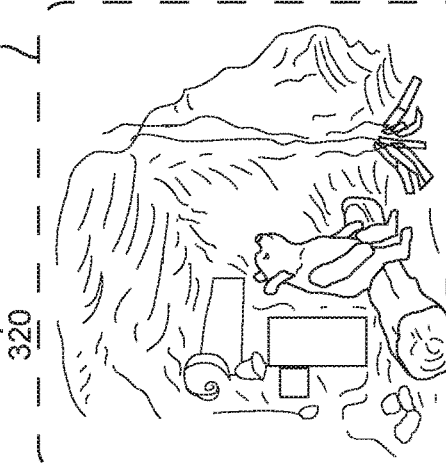
FIG. 3 illustrates an exemplary user interface embodiment for triggering a predefined interaction event.

FIG. 3 illustrates an exemplary user interface embodiment for triggering a predefined interaction event. As shown, eBook 300 is currently being displayed on an electronic device. The electronic device can be portable and can include components typically found in a computing device such as a processor, a memory containing computer readable instructions, and an output device such as a display. Although eBook 300 is shown here in a landscape orientation, the eBook can also be displayed in a portrait orientation in other examples. The orientation and the digital media item presented on the display are controlled by a reader application running on the electronic device. In some examples, the electronic device can combine a display with other input/output devices to present digital media items to the user. An exemplary reader application is Apple Inc.'s iBooks™ application and an exemplary electronic device is Apple Inc.'s iPhone™ or iPad®.

In this example, eBook 300 titled "Winnie-the-Pooh" is being presented by the reader application. The reader application (or the eBook) can be programmed to include hot spots. A hot spot is a predetermined area on the eBook that a user can select to cause an action to occur. For example, selecting the hot spot can initiate a predefined interaction event, such as a gifting event. The hot spot area can be on the cover of the eBook, the table of contents, title page, images, or other locations in the eBook. Furthermore, the hot spot area can also be on menus in the iBooks application such as a specific menu option to initiate the gifting event. In this example, hot spot 310 is an image in eBook 300. If the image appeals to the reader, the reader can select the image by touching the image. After selecting the image, a user can create a gifting event by selecting menu 320. Menu 320 can be a pull down menu that includes a user selectable option for gifting an eBook. Another option of menu 320 or a pop-up screen can be used by the reader to personalize the gifted eBook. For example, an option in menu 320 can be configured to control the creation of a personal message. The gifted eBook can also be personalized by adding other digital content (e.g., signature, text box, audio clip, image, photo album, video, other media content). Menu 320 can also include an option to toggle on and off the personalization effects. In response to receiving a selection of image 310 followed by a selection to gift the eBook in menu 320, the reader application can create a gifted eBook. A personal message can be included in the gifted eBook or the email notifying the recipient of the gifted eBook, where the personal message includes selected image 310. The reader application can be programmed to recognize the sequence of receiving a user selection of digital content followed by receiving a user selection to gift the eBook triggers a gifting event.

In some examples, the predefined interaction event can be initiated through a touch gesture. For example, a user can touch and hold a spot on image 310 to initiate a predefined interaction event such as a gifting event. Touching and holding a spot on image 310 can cause the reader application to generate and present a pop up menu to the user. The pop up menu can be similar to the pull down menu described above and can be used to gift and/or personalize the eBook. Pressing and holding the desired spot can result in a pop up menu for configuring the type of autograph that will be created. In yet other examples, the autograph page can be generated through a combination of the examples described.

Figure 4:
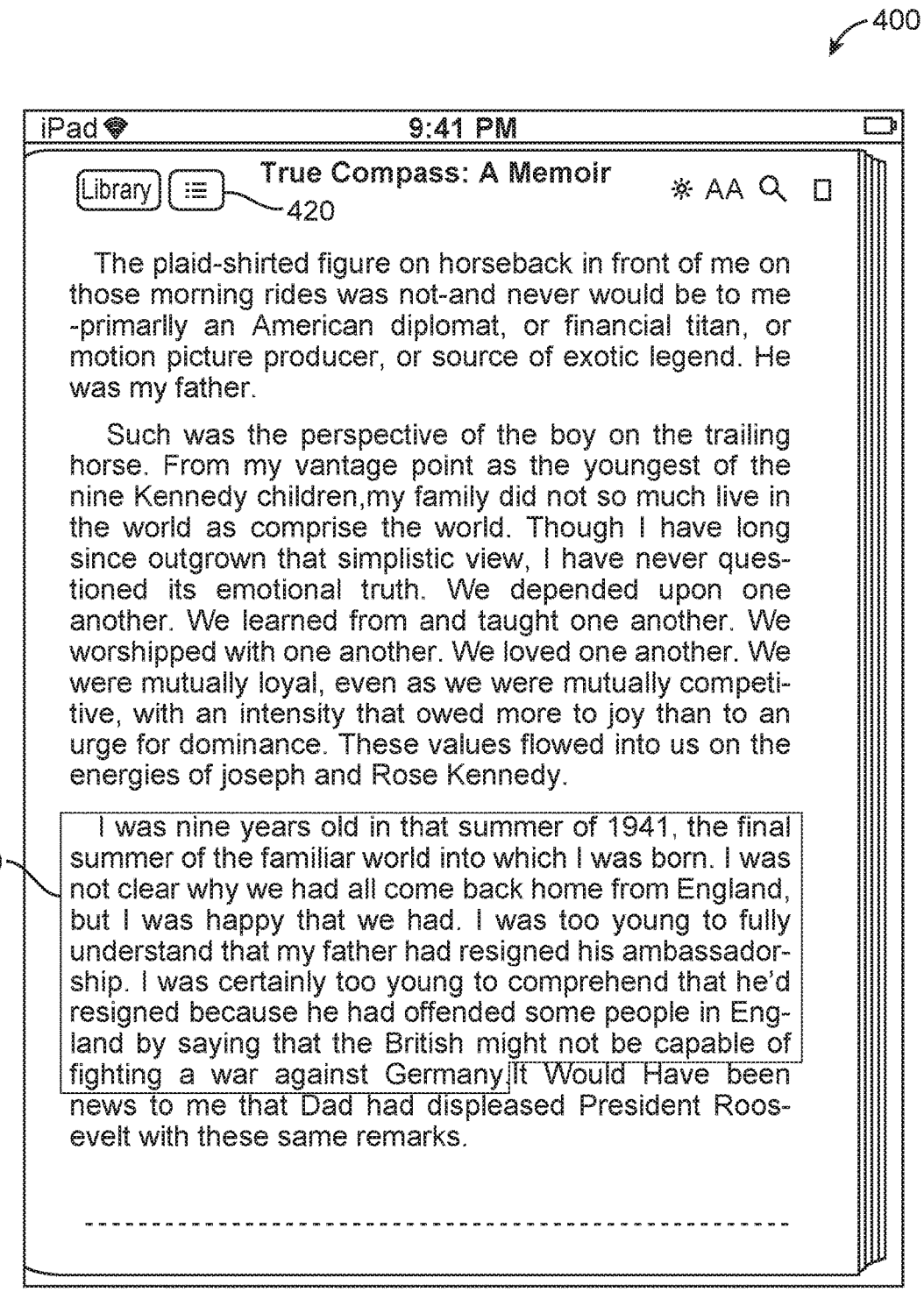
FIG. 4 illustrates another exemplary user interface embodiment for triggering a predefined interaction event.

FIG. 4 illustrates another exemplary user interface embodiment for triggering a predefined interaction event. As shown, eBook 400 is in portrait orientation however eBook 400 can switch between portrait orientation and landscape orientation based on reader preference or the orientation of the electronic device. As shown here, a block of text from the eBook 400 presented on the display of the electronic device has been selected by highlight 410. Text highlighted by highlight 410 can be a quote or passage that the reader associates with another person, thus making the quote or passage appealing to the reader.

In one embodiment, a user can highlight text in the eBook through a contextual touch gesture (such as placing a finger down at the beginning of the text and swiping to the end of the portion of text). A user can select highlight 410 by pressing and holding onto the highlight. Selecting highlight 410 can trigger the predefined interaction event. This can result in a pop up menu as discussed above in FIG. 3 with user selectable options to gift the eBook. The user selectable options can also include incorporating the highlighted text as part of a personal message or to associate a dedication or note to the highlighted text. In another embodiment, the reader can create and optionally personalize a gifted eBook through menu 420. For example, a user can select menu 420 after selecting a passage or highlighted text in the eBook. A plurality of user selectable options can be presented to the user, including one or more options gifting the eBook. The options can include personalizing the eBook by incorporating the selected passage or highlighted text in a personal message to the recipient. The personal message can be placed at a particular location in the eBook or associated with text in the book. Associating the personal message with text in the eBook can be useful for reader applications or eBooks with flowing text. Alternatively, a note to the recipient can be associated with the selected passage or highlighted text. In yet other examples, the gifting of an eBook can be performed using a combination of the examples described.

Figure 5:
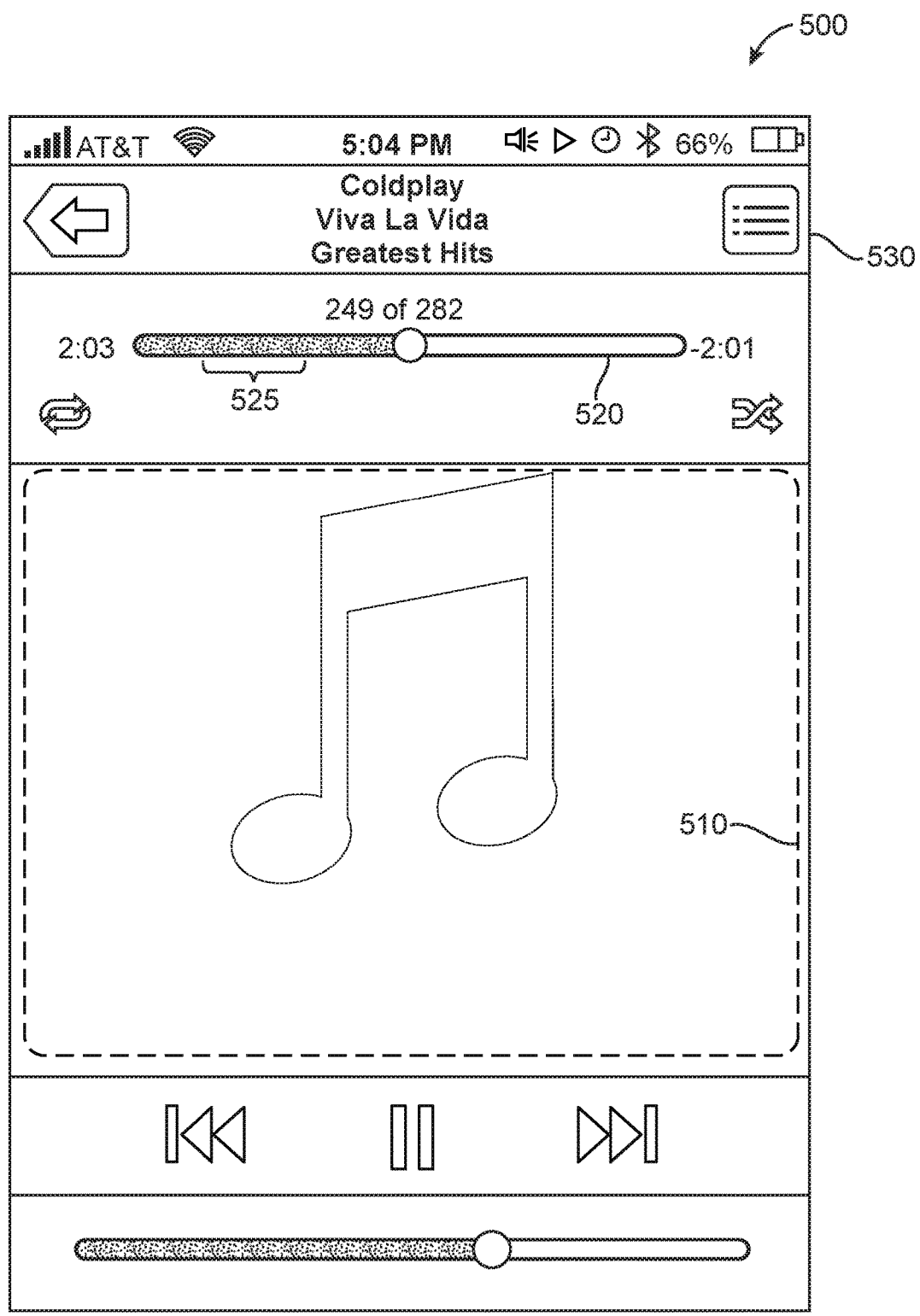
FIG. 5 illustrates another exemplary user interface embodiment for triggering a predefined interaction event.

FIG. 5 illustrates another exemplary user interface embodiment for triggering a predefined interaction event. In this example, a listener is playing a song on an electronic device via an audio playback application. As shown on display 500, the electronic device is presently playing back an audio file by Coldplay titled "Viva La Vida." Display 500 includes hot spot 510 and scrubber bar 520. In one embodiment, a user can touch and hold a spot within hot spot 510 to trigger a gifting event. Here, the gifting event is triggered at the 2:03 minute mark of the audio file. The point in the audio file in which the user triggers the gifting event (e.g., event mark) can be used by the application to determine which portion or segment of the audio file appeals to the listener. Assuming that the user decided to trigger the gifting event at the event mark, the audio playback application determines that the segment of the song surrounding the event mark likely appeals to the listener. As a result, the audio playback application selects a segment of the song surrounding the event mark as the portion of the song that the listener is interested in. This segment can be incorporated into the creation of a personal message for the recipient. Depending on the listener's settings, the selected segment can expand or shrink based on a predefined window. For example, the listener can select to capture 2 seconds of audio surrounding the event mark, 5 seconds of audio surrounding the event mark, or some other predefined period of time surrounding the event mark. In another embodiment, the user can manually select the portion of interest. For example, a listener can select window 525 of scrubber 520 as the segment of the song that is appealing.

After the segment of the song that appeals to the listener has been determined, a listener can complete the gifting process by selecting one or more gifting options under menu 530. Menu 530 can be implemented similarly or substantially similar to menu 320 of FIG. 3 or menu 420 of FIG. 4. The options can specify how the gifted audio file shall be personalized, the notification that will be sent to the recipient, the contents of a dedication, and others. For example, the audio file can be personalized for another listener by adding a personal message in the song or in the notification that goes out to the recipient. In other examples, the listener can complete the gifting process by using touch gestures and pop-up menus to set the parameters of the gift without having to interact with menu 530. In yet other examples, this method for triggering a predefined interaction event can be applied to other types of digital media, such as video.

Personalization

Figure 6:
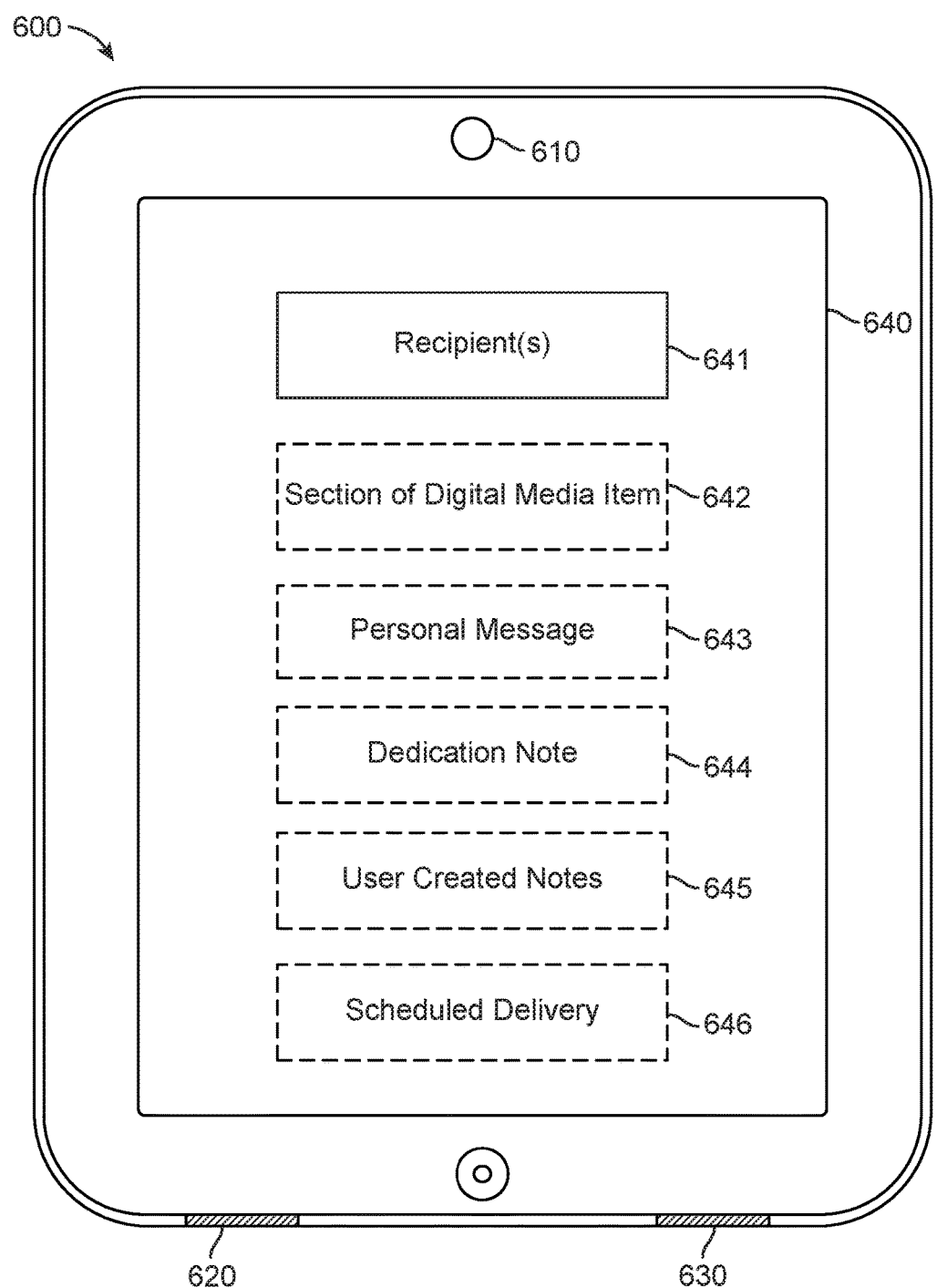
FIG. 6 illustrates an exemplary user interface embodiment for personalizing a digital media item.

FIG. 6 illustrates an example user interface embodiment for personalizing a digital media item. As shown here, electronic device 600 is displaying a fillable form for gifting a digital media item on display 640. Electronic device 600 includes four input/output components: camera 610, speaker 620, microphone 630 and display 640. In other examples, electronic device 610 can have more or fewer components.

After a determination is made that the user would like to gift a copy of a digital media item to another, electronic device 600 can display a fillable form on display 640. The fillable form can present one or more options configured for personalizing or setting up the gift. The fillable form can include field 641 for specifying the recipient or recipients of the gift. Field 641 can be populated with an account ID associated with each recipient. In a cloud computing system, the recipients and the gifter can have accounts to an online store configured to distribute and sell digital media items. Each account can be associated with an account ID that uniquely identifies a user of the online store. The gifter can gift a copy of a digital media item to one or more recipients by specifying the account IDs of the recipients. Upon gifting a copy of the digital media item, the gifter can be charged a fee associated with owning a copy of the digital media item. If multiple copies are gifted, the gifter is charged for each copy gifted. In some examples, a search feature is available to assist the gifter in locating the account ID of the recipient.

The fillable form can also include field 642 for specifying the section of digital media item that appeals to the gifter. Field 642 can be populated with a variety of data depending on the digital media item being gifted. In essence, the field 642 can include any data that is part of the digital media item. For example, field 642 can be populated with a video, audio clip, or text when the digital media item is a digital textbook containing video, audio clips, and text. In some examples, field 642 can be automatically populated with a section of the digital media item selected by the user during the gifting process. In these examples, field 642 can be optional.

The fillable form can also include optional field 643 for populating a personal message. The personal message can part of the notification for the recipient. The personal message can also be used to personalize the copy of the digital media item. Depending upon the implementation details, the personal message can incorporate the section of digital media item 642 that appealed to the gifter.

The fillable form can also include optional field 644 for populating a dedication note. A dedication note can be a dedication that is presented to the user whenever a digital media item is accessed. The dedication note can be a note, video, or other digital content generated by the gifter. The dedication note can also include the section of digital media item that the gifter found appealing.

The fillable form can also include optional field 645 for populating user created notes. Notes created by the user can be part of the user's digital media item. For example, a user can create notes, highlights, and bookmarks in an eBook, collectively known as the user created notes. These user created notes can be created by the user to further the user's understanding or appreciation of the eBook. If the user chooses to gift a copy of this eBook to another, the user can optionally also include some of or all of the user created notes with the gifted eBook.

The fillable form can also include optional field 646 for populating a scheduled delivery. The gifted digital media item can be delivered to the recipient depending on a delivery schedule. If desirable, a user can populate a delivery schedule option of the fillable form and specify when the gifted digital media item is to be delivered. For example, a mother may wish to deliver a music album to her son on his birthday. The mother can populate optional field 646 with her son's birthdate as the delivery date to ensure that the music album will be received by the son on his birthday, rather than the day before his birthday or the day after his birthday. The scheduled delivery date can control the date (and time) that the digital media item is associated with the recipient's user account or alternatively control the date (and time) that a notification is send to the recipient to notify the recipient of the gift.

In some examples, camera 610 and speaker 630 can be used, together or independently, to capture digital data to populate one or more fields of the fillable form. For example, a user can create utilize camera 610 and microphone 630 to record a dedication video of herself speaking to camera 610. The user can review the video using display 640 and speaker 620. If the video is approved by the user, the user can then populate the video into dedication note 644. Whenever the recipient opens the digital media item, the dedication video will be presented to the recipient before the recipient gains access to the contents of the digital media item. The dedication video can be toggled on and off by the recipient.

Figure 7:
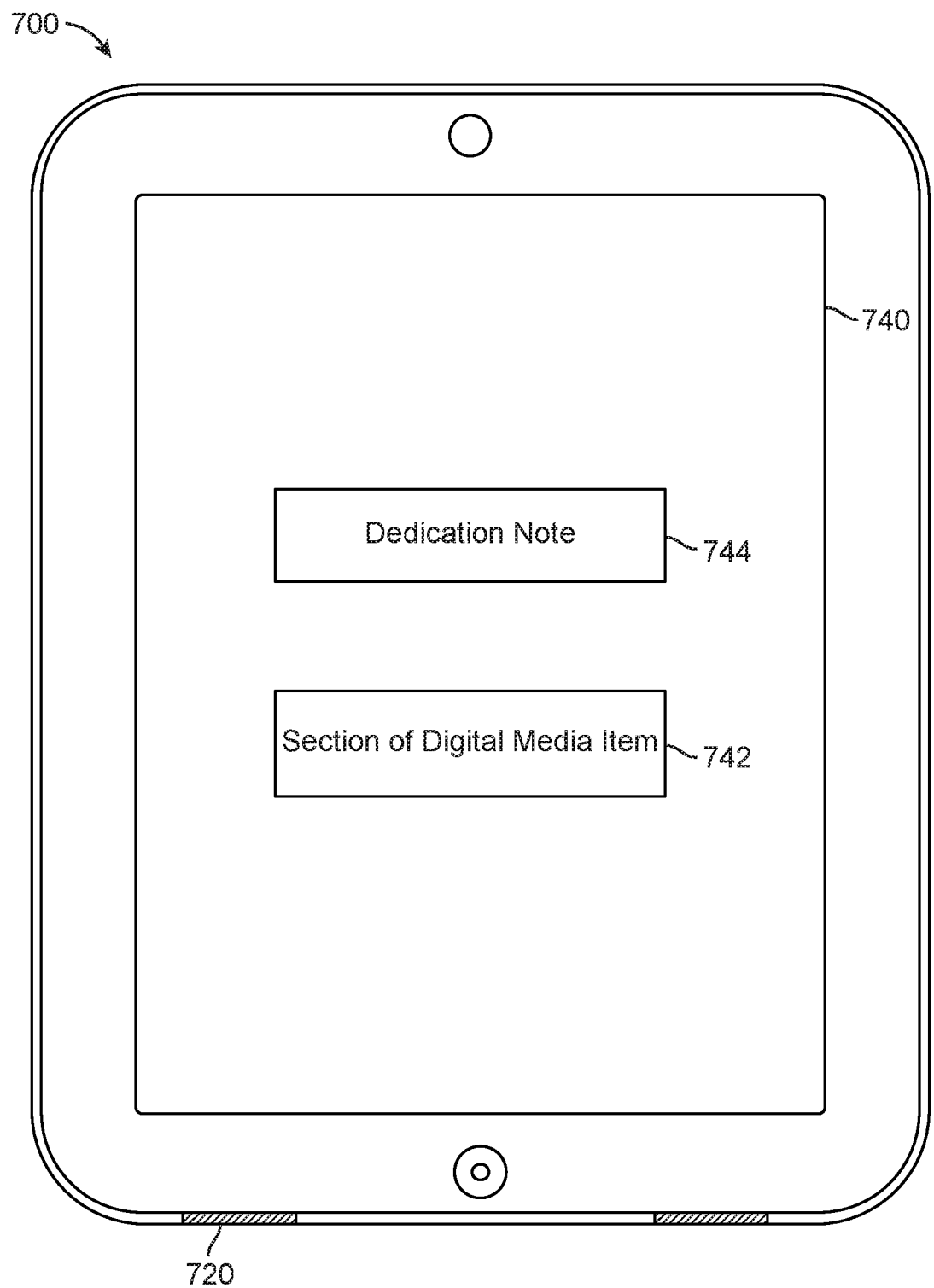
FIG. 7 illustrates an exemplary dedication page.

FIG. 7 illustrates an exemplary dedication page. Electronic device 700 has downloaded a gifted digital media item and has selected the digital media item for playback. Before playback of the gifted digital media item begins, the dedication page is presented to the user. The dedication page can be presented on display 740. The dedication page can include dedication note 744 and section of digital media item 742. The dedication note 744 can be a personal message that the gifter has prepared specifically for the recipient. For example, the dedication page can include a dedication note which states "When I saw this baby panda, I thought of you!" The dedication note can be text, an image, an audio recording, a video recording, or any combination of the above. If the dedication note includes audio, the audio is presented to the user via speaker 720. The dedication page can further include a section of the digital media item. The section of digital media item 742 can be the section of the digital media item that the gifter associates with the recipient. The section can be text, an image, an audio recording, a video recording, or any combination of the above that is present in the digital media item. While the section of the digital media item already exists in the gifted digital media item, it is desirable to also have the section of the digital media item on the dedication page so that the recipient of the gift is aware of the circumstances that surround the gift. The recipient may also be interested in what the gifter found appealing in this digital media item or what portion of the digital media item the gifter associates with the recipient. For example, the section can include an image of a baby panda eating. Once the dedication page has finished presentation to the user, the user can gain access to the digital media item. In yet other examples, no notification is sent and the recipient is simply notified of the available gift when the recipient logs into the online store.

Notifications

Figure 8:
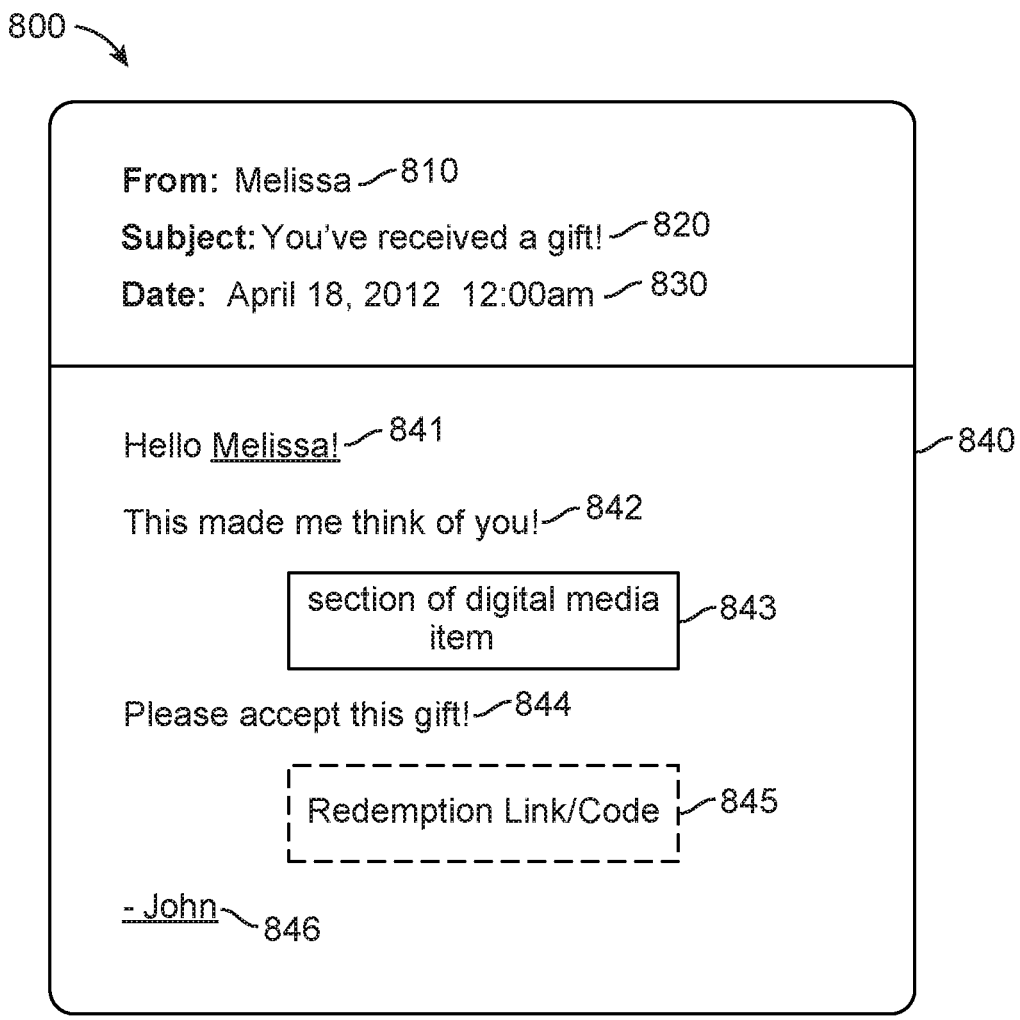
FIG. 8 illustrates an exemplary notification.

FIG. 8 illustrates an exemplary notification. Notification 800 is an exemplary email to notify the recipient of an incoming gifted digital media item. The notification can be transmitted from an online store to an email account associated with the recipient's user account. Alternatively, the notification can also be transmitted from a mail server associated with the gifter's email account to the recipient's email account. As shown, notification 800 includes a sender field 810. Sender field 810 displays the name of the party that sent the email. In some examples, sender field 810 can be automatically populated with the formal name associated with the gifter's user account. Here, sender field 810 is automatically populated with the name "Melissa." Notification 800 can also include subject field 820. Subject field 820 provides the recipient a description of the subject matter in this email. In some examples, subject line 820 can be automatically populated with a generic statement such as "You've received a gift!" or "You've received a gift from <gifter's name>!" In other examples, the subject can be manually provided by the gifter. Notification 800 can also include date stamp 830. Date stamp 830 provides information about the time and/or date that the email was sent from the gifter. In some examples where the gifter requests a scheduled delivery, the email can be sent at a date and time specified by the gifter.

Figure 9:
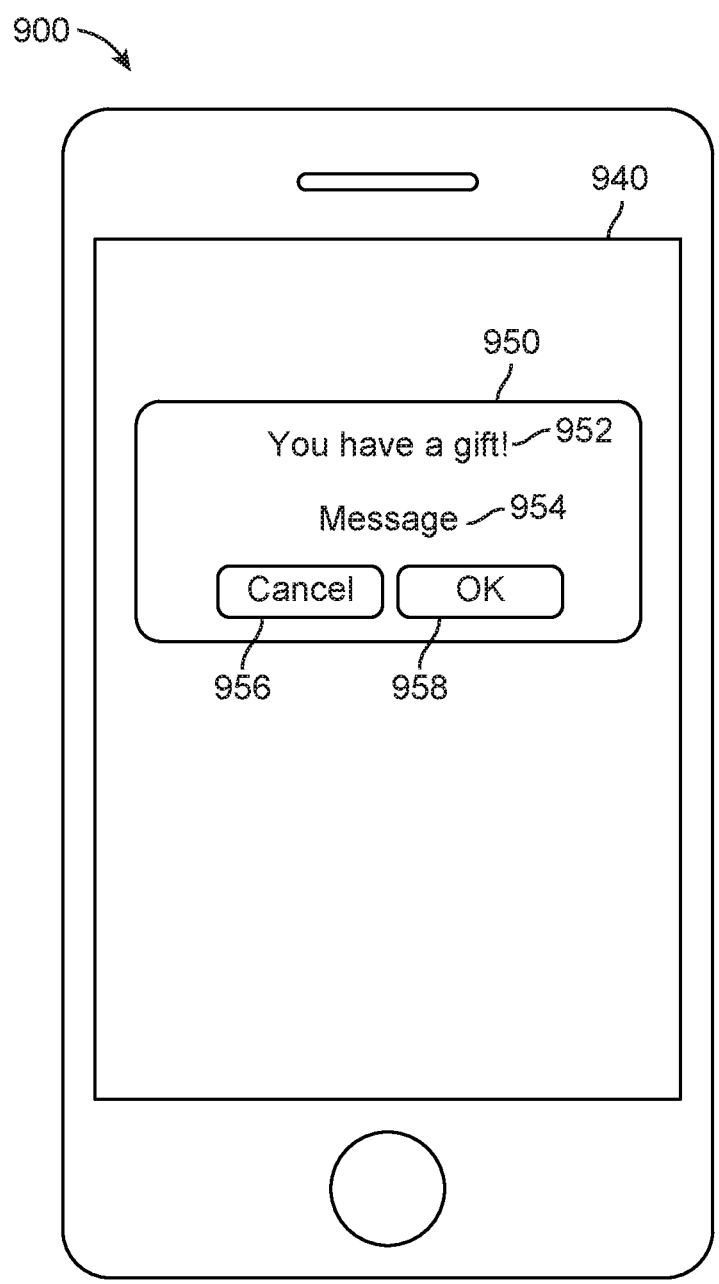
FIG. 9 illustrates another exemplary notification.

Notification 800 can further include message body 840. Message body 840 can be automatically generated, manually generated, or manually generated with portions of the message that are automatically populated. Message body 840 can include recipients name 841, text 842 introducing the recipient to the section of the digital media item that the gifter associates with the recipient, the section of the digital media item 843, text 843 notifying the recipient that the gifter has sent a copy of the digital media item as a gift, and the name of the gifter 846. In examples where the online store does not automatically associate the gifted digital media item to the recipient's user account (thus offering the recipient the option to re-gift or deny the gifted digital media item), a redemption link or code 845 can be included in message body 840. The redemption link or code 845 can also include links to accept or deny the gifted digital media item. Based on the response received from the recipient, the online store can associate the gifted digital media item to the recipient's user account FIG. 9 illustrates another exemplary notification. Notification 950 received on electronic device 900 and displayed on display 940 is a push notification. A push notification is a communication initiated by the cloud or other central server that is sent to a recipient. Push notifications allow a recipient to receive updates or new messages without having to initiate a request to the central server for communications. Notification 950 can be a text message that is received on electronic device 900, a pop-up notification received on electronic device 900, or other notification received by electronic device 900. As shown here, notification 950 includes title 952, message 954, and options 956 and 958. Title 952 can be a title line associated with notification 950, such as "You have a gift!" Similarly message 954 can be a message describing the contents of notification 950. For example, the message can state "<Gifter> has gifted you a copy of <title of digital media item>. Would you like to accept the gift?" In some examples, message 954 can include a redemption code to redeem the gift. In some examples, title 952 and/or message 954 can be automatically generated by the device operated by the gifter or the online store.

Options 956 and 958 can provide the recipient user-selectable options to respond to the message. There can be more or fewer options. For example, the recipient can cancel notification 950 by selecting option 956. By cancelling the notification, electronic device 900 does not respond to the notification. However, electronic device 900 can still respond to notification 950 at a later point in time through an application on electronic device 900 that maintains all received notifications. Alternatively, the user can accept the gift by selecting option 958. When the user accepts the gift, a notification can be sent from electronic device 900 to inform the online store that the recipient has accepted the gift. As a result, the online store can adjust the ownership rights associated with the recipient's user account accordingly. In some examples, selecting option 958 can link the user to another application configured to manage ownership rights of the recipient. The recipient can review the digital media items owned and decide whether to accept the gift.

Figure 10:
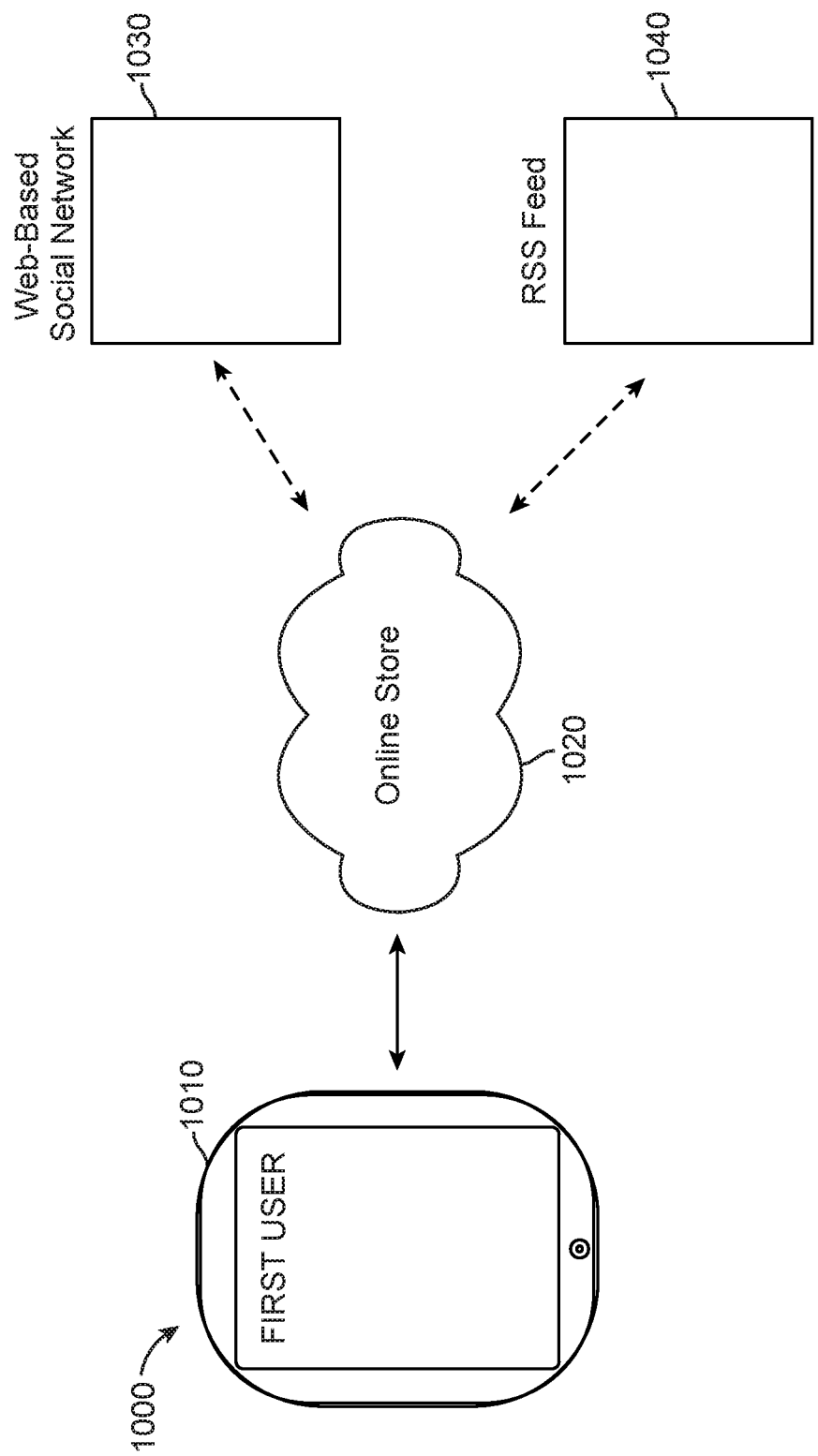
FIG. 10 illustrates an exemplary notification system.

FIG. 10 illustrates an exemplary notification system. System 1000 is a notification system configured to inform a recipient of a gifted digital media item. The recipient can receive a notification of the gifted digital media item through a post on a web-based social network, an RSS feed, or other web publishing/social networking services. In some examples, the notification can be requested from a gifter and processed by an online store (or remote server) which generates the notification and posts the notification using a web publishing service. Here, system 1000 includes electronic device 1010, online store 1020, web-based social network 1030, and RSS feed 1040. Electronic device 1010 receives instructions from a user to personalize a digital media item for gifting purposes. Electronic device 1010 can communicate with online store 1020 to personalize a copy of the digital media item and create a gifted digital media item. After generation of the gifted digital media item, a notification can be sent to one of many social networking services.

In one embodiment, the gifted digital media item can be automatically associated with the recipient's user account on the online store once the gifted digital media item has been created. After associating the gifted media item to the recipient, online store 1020 can transmit a notification to a social networking service. For example, the notification can be sent to web-based social network 1030. Web-based social network 1030 can contain a plurality of users each having a unique user profile. The user profile can include a wall where other users in the social network can post comments, messages, links, etc. to the user. Here, the notification can be posted on a social network page associated with the recipient's profile, such as the recipient's wall. Posting the notification on the recipient's page can serve multiple purposes. First, the notification will be visible to the recipient when the recipient logs into her profile on social network 1030. Thus, the notification serves as a means for notifying the recipient of the gift. Second, the notification will be visible to other members of social network 1030. If the digital media item is of interest to other members, those members can elect to purchase a copy of the digital media item. Therefore, posting the notification on the social network also generates interest and traffic for the digital media item, thus potentially increasing sales of the digital media item. The notification can include a link to purchase the digital media item.

In some embodiments, the digital media item can be purchased by other members in the social network. The digital media item can be purchased by other members with the same personalization data that was gifted to the recipient. For instance, a song that was gifted from an artist where the song had been personalized with a dedication from the artist can be purchased by other members of the social network with the same dedication. The personalization data can be saved as metadata on the online store 1020. In one example, a single copy of the personalization data can be saved on the online store and associated with the user accounts that have a right to access the personalization data. Therefore if a member were to already own a copy of the song, purchase of the personalized version can result in simply associating the personalization data on the online store with the user account of the member. Thus, the list of songs that the member has access to remains the same however the member's personalization data has been updated. In another example, each user account can store a copy of the personalization data. This can allow each user to further personalize the digital media item by adding in the user's own unique notes, highlights, etc. to the digital media item. Alternatively, the personalization data can be stored locally on electronic device 1010 rather than the online store 1020. The electronic device 1010 can receive the personalization data along with the digital media item after the use purchases the digital media item. In another example, only a copy of the digital media item can be purchased without the personalization data. Since the personalization data was created for the particular recipient by the gifter, the personalization data is not available for purchase by other members in social network 1030.

In another embodiment, the gifted digital media item is available for redemption by the recipient after the notification is posted on the recipient's page on social network 1030. After reviewing the notification, the recipient can elect to accept the gifted digital media item. If the recipient accepts the gift, a response is sent to online store 1020 to update the recipient's user account on online store 1020 so that the recipient has rights to the gifted digital media item. A link may be provided in the notification as an easy way for the recipient to accept the gift. Alternatively if the recipient declines the gift, social network 1030 can respond to the rejection. For example, social network 1030 can remove the post from the recipient's page. As another example, social network 1030 can leave the post on the recipient's page so that a friend or other member of social network 1030 has the opportunity to redeem the gifted digital media item. After the first person redeems the gift, the post can be automatically removed or alternatively be left on the page so that other members can see the post and optionally purchase the digital media item. As yet another example, social network 1030 can leave the post on the recipient's page so that other members have the option to purchase the digital media item. However, since the recipient declined the gift, online store 1020 can be notified of the rejection and either credit back the gifter the amount charged for the gift or notify the gifter so that the gifter can gift the digital media item to another person. In yet other examples, a similar post can be made on the gifter's page in social network 1030 as a way for the gifter to let other members know that she gifted a digital media item to the recipient.

In other examples, the gifter can request online store 1020 to transmit the notification to an RSS feed associated with the recipient or the gifter. The RSS feed 1040 can be used as an easy way for the gifter or the recipient to provide updates to the public. The discussions above with respect posting on a page of social network 1030 also is applicable to posting an update on an RSS feed of the gifter or the recipient.

In another embodiment, online store 1020 can broadcast and post the notification on multiple social networking services associated with the recipient. By posting the notification on multiple social networking services, the gifted digital media item can receive better exposure. Members of the social networking services can receive an update describing the gifted digital media item or alternatively view a post describing the gifted digital media item when they visit the recipient's page. This can be a default option or an option selectable on electronic device 1010. In this scenario, online store 1020 can transmit a message related to the gifted digital media item to multiple social networking services that the recipient has signed up for. Each social networking service can receive a message that has been uniquely formatted to ensure that the message can be properly digested by a given social networking service. When the recipient uses one of the social networking services to respond to the notification, that response is transmitted to online store 1020. Online store 1020 can either share the response with other social networking services and/or broadcast an update to the social networking services. For example, a recipient can respond via RSS feed 1040 that he has accepted the gifted digital media item. The response can be processed by online store 1020 and the gifted digital media item can be associated with the recipient's user account. After updating the recipient's user account, online store 1020 can transmit updates to web-based social network 1030 and RSS feed 1040. The update can request that the social networking services delete the post related to the gift or alternatively, update the post stating that the recipient has accepted the gift. If the recipient has rejected the gift, a similar update can be transmitted to the social networking services, thus updating the members of those services that the recipient has elected to reject the gift. In some examples, a rejected gift can be reclaimed by another member in the social networking services.

Gifting Methods

Figure 11:
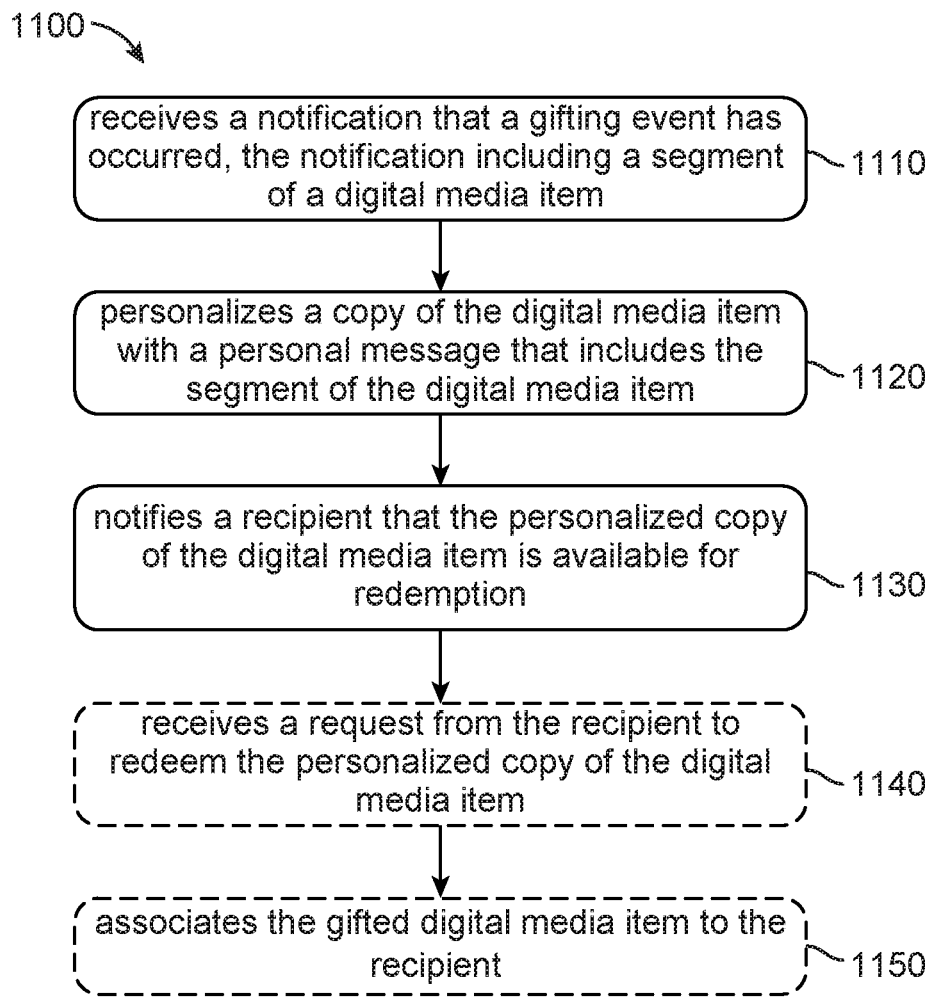
FIG. 11 illustrates an exemplary process for gifting a copy of a digital media item to another user.

FIG. 11 illustrates an exemplary process for gifting a copy of a digital media item to another user. The process can be stored as computer readable code and processed by a processor, such as a server on an online store. Process 1100 receives a notification that a gifting event has occurred, the notification including a segment of a digital media item (1110). The notification of the gifting event can be transmitted from an electronic device that is presently processing the digital media item. In one example, the gifting event can be triggered by the gifter selecting a segment of a digital media item as it is being processed, where the segment appeals to the gifter or reminds the gifter of the recipient. After receiving the notification, the processor executing process 1100 personalizes a copy of the digital media item with a personal message that includes the segment of the digital media item (1120). The personalization, which can be stored as metadata associated with the copy of the digital media item can include a dedication that is presented before presentation of the copy, notes from the gifter that are attached to the copy, or additional features or information that are attached to the copy. Each of these forms of personalization can include the personal message. After personalizing a copy of the digital media item, the processor executing process 1100 notifies a recipient that the personalized copy of the digital media item is available for redemption (1130). The notification can be transmitted to an electronic device associated with the recipient, such as a recipient's smart phone, hand held device, or portable computer. The recipient can respond to the notification by instructing the device to transmit a response accepting the gift or rejecting the gift. Alternatively, the recipient can choose to not respond at all. If the recipient does respond with a request to redeem the gift, the processor executing process 1100 receives a request from the recipient to redeem the personalized copy of the digital media item (1140). In response to the request to redeem, the processor executing process 1100 associates the gifted digital media item to the recipient (1150). The gifted digital media item can be associated to the recipient by updating the recipient's digital media library to include the gifted digital media item.

Figure 12:
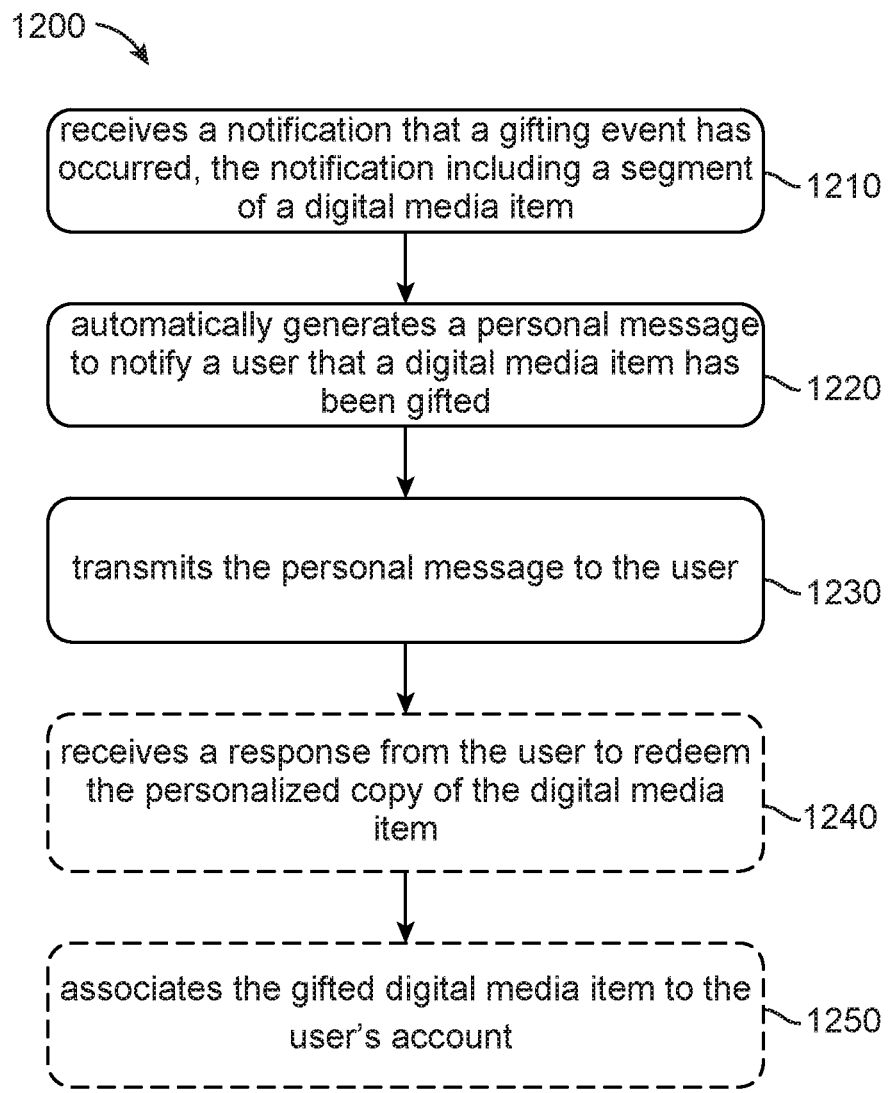
FIG. 12 illustrates another exemplary process to gift a copy of a digital media item to another.

FIG. 12 illustrates another exemplary process to gift a copy of a digital media item to another. The processor executing process 1200 receives a notification that a gifting event has occurred, the notification including a segment of a digital media item (1210). The notification can be sent from an electronic device operated by the gifter and the segment of the digital media item can be a segment that appeals to the gifter. The segment can be a portion of the digital media item that the gifter associates with the user. After receiving the notification, the processor executing process 1200 can automatically generate a personal message to notify a user that a digital media item has been gifted to that user (1220). The personal message can be an email, text message, post on a social network site, or other communication to the user. The personal message can inform the user that he has a gift available for redemption and also the circumstances surrounding the gift. For example, the personal message can include the section of the digital media item that the gifter associates with the user along with a message explaining the reason the gifter has decided to gift this digital media item to the user. An exemplary message can be "This picture totally looks like you" followed with picture (which happens to be the segment of the book that the gifter associates with the user). After generating the personal message, process 1030 transmits the personal message to the user (1230). The personal message can be transmitted to a device associated with the user, a social media website associated with the user, or to an email/ physical address associated with the user. After transmitting the personal message to the user, the processor executing process 1200 can sometimes receive a response from the user to redeem the personalized copy of the digital media item (1240). The response can be generated by selecting a link on the user's electronic device. In some examples, the response can include a redemption code or unique identifier associated with the user that can be processed by the processor executing process 1200 to confirm the user's right to redeem the gifted digital media item. In one example, the user's unique identifier and a redemption code must both be entered properly before a digital media item can be redeemed. This can be to ensure that only the user can redeem the gifted digital media item. In other examples where others can also redeem the gifted digital media item, it can be unnecessary to include the unique ID of the user in the response. After the response is received, the processor executing process 1200 associates the gifted digital media item to the user's account (1250). In some examples, verification can first be performed to ensure that the gifted digital media item can be associated with the user account. For example, verification can include verifying that the gifted digital media item is intended for the user and/or that the user has provided the proper redemption code to redeem the gifted digital media. Once properly verified (if need be), the user's library can be associated with the copy of the digital media. The digital media can be personalized with metadata associated with the gifter to make this copy of the digital media item different than others.

Figure 13:
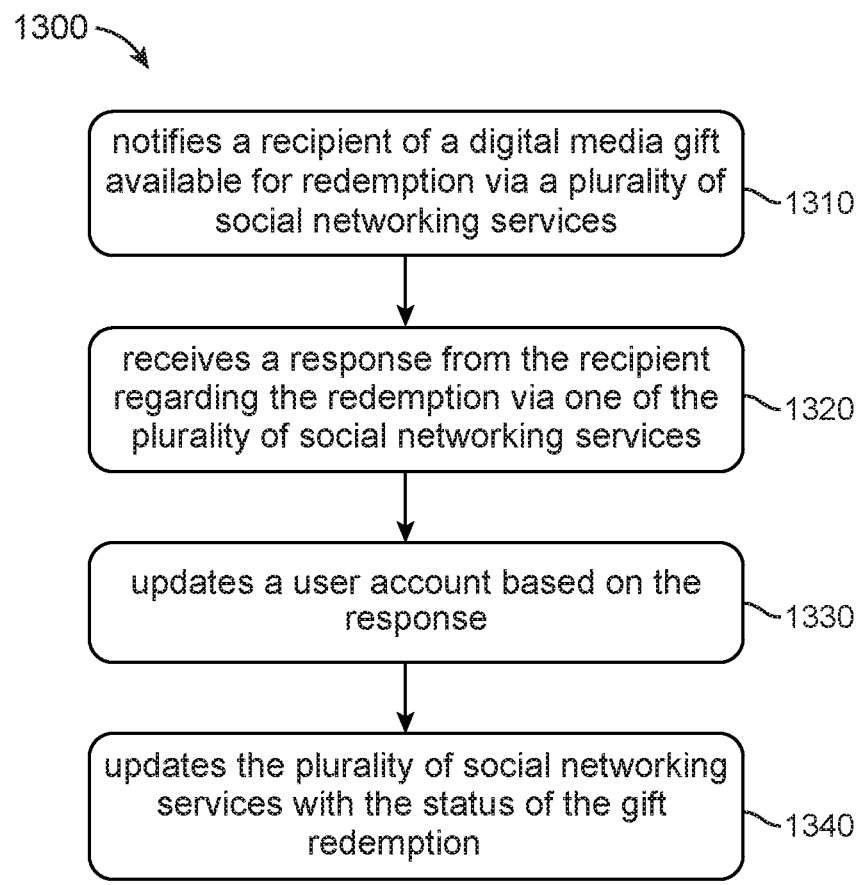
FIG. 13 illustrates another exemplary process for gifting a digital media item.

FIG. 13 illustrates another exemplary process for gifting a digital media item. The processor executing process 1300 notifies a recipient of a digital media gift available for redemption via a plurality of social networking services (1310). A notification can be sent to each social networking service that the recipient is a member of. The social networking services can receive the notification and generate a post or update that can be posted on a page belonging to the recipient. The post or update can include a description of the gift and a link to accept or reject the gift. These posts or updates are viewable by other members on the social networking services and can be a way for the digital media item to gain greater exposure. In some examples, a preview link can be included in the post or update so that other members can preview the digital media item and potentially purchase their own copy. A period of time can pass after notifying the recipient of the digital media gift. If the period of time that passes is greater than a predefined period of time, the processor executing process 1300 can automatically transmit a request to remove the posts or updates. This can prevent the posts from cluttering the recipient's pages or appear as spam. Process 1300 can continue when it receives a response from the recipient regarding the redemption via one of the plurality of social networking services (1320). The response can be that the recipient wishes to accept the gift, reject the gift, or re-gift the gift to another party. After receiving the response from the recipient, the processor executing process 1300 updates a user account based on the response (1330). In one example, a media library associated with the recipient can be updated to include the gifted digital media when the recipient accepts the gift. In another example, a gifter's user account can be credited back the fee associated with purchasing the digital media gift when the recipient denies the gift. In yet another example, a third party's media library can be updated to include the digital media gift when the recipient re-gifts the gift to the third party. After the user account has been updated based on the response, the processor executing process 1300 updates the plurality of social networking services with the status of the redemption. In other words, a recipient's response received on one social networking service can be automatically updated to the remaining social networking services. This can allow a recipient to inform the members on all of the social networking services that the recipient is a part of without having to manually post a response on each social networking service.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, solid state drives, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied other types of files to control the secure deletion of those files and other copies of those files from storage. Those skilled in the art will readily recognize various modifications and changes that may be made to the principles described herein without following the example embodiments and applications illustrated and described herein, and without departing from the spirit and scope of the disclosure.

We claim:

1. A computer implemented method comprising:
receiving, from a first device by a processor, a selected portion of content of a digital media item from an online media store library accessible to a first user account;
personalizing, by the processor, the digital media item with a personal message to generate a gifted digital media item, the personal message including the selected portion of content of a digital media item;
notifying, a second user account by the processor, that the gifted digital media item is available for redemption;
receiving, by the processor, a request associated with the second user account to redeem the gifted digital media item; and
associating, by the processor, the gifted digital media item and personal message with an online media library corresponding to the second user account in response to the request; and
updating, by the processor, the second user account with the redeemed status of the gifted digital media item.

2. The computer implemented method of claim 1, wherein the selected portion comprises a portion of playable media content from the digital media item selected on the first device.

3. The computer implemented method of claim 1, wherein the first user account is charged a fee for generating the gifted digital media item.

4. The computer implemented method of claim 1, further comprising receiving a note that is associated with the digital media item, the note being generated by the first device.

5. The computer implemented method of claim 1, wherein personalizing the digital media item comprises associating a dedication to the gifted digital media item, wherein the dedication is presented before presentation of the gifted digital media item.

6. The computer implemented method of claim 1, wherein the request includes a redemption code.

7. The computer implemented method of claim 1, further comprising:
receiving a request from the second user account to gift the gifted digital media item to a third user account; and
associating the gifted digital media item to the third user account in response to the request.

8. The computer implemented method of claim 1, wherein the personal message further includes a link to redeem the gifted digital media item.

9. A system comprising:
at least one processor; and
a memory storing instructions, which when executed by the at least one processor, causes the at least one processor to:
receive, from a first device, a selected portion of content of a digital media item from an online media store library accessible to a first user account;
personalize the digital media item with a personal message to generate a gifted digital media item, the personal message including the selected portion of content of a digital media item;
notify, a second user account, that the gifted digital media item is available for redemption;

receive a request associated with the second user account to redeem the gifted digital media item; and associate the gifted digital media item and personal message with an online media library corresponding to the second user account in response to the request; and update the second user account with the redeemed status of the gifted digital media item.

10. The system of claim 9, wherein the selected portion comprises a portion of playable media content from the digital media item selected on the first device.

11. The system of claim 9, wherein the first user account is charged a fee for generating the gifted digital media item.

12. The system of claim 9, further comprising instructions which when executed by the at least one processor, causes the at least one processor to receive a note that is associated with the digital media item, the note being generated by the first device.

13. The system of claim 9, wherein personalizing the digital media item further comprising instructions which when executed by the at least one processor, causes the at least one processor to associate a dedication to the gifted digital media item, wherein the dedication is presented before presentation of the gifted digital media item.

14. The system of claim 9, wherein the request includes a redemption code.

15. The system of claim 9, further comprising instructions which when executed by the at least one processor, causes the at least one processor to:

receive a request from the second user account to gift the gifted digital media item to a third user account; and associate the gifted digital media item to the third user account in response to the request.

16. The system of claim 9, wherein the personal message further includes a link to redeem the gifted digital media item.

17. At least one non-transitory computer readable medium storing instructions, which when executed by at least one processor, causes the at least one processor to:

receive, from a first device, a selected portion of content of a digital media item from an online media store library accessible to a first user account;

personalize the digital media item with a personal message to generate a gifted digital media item, the personal message including the selected portion of content of a digital media item;

notify, a second user account, that the gifted digital media item is available for redemption;

receive a request associated with the second user account to redeem the gifted digital media item; and associate the gifted digital media item and personal message with an online media library corresponding to the second user account in response to the request; and update the second user account with the redeemed status of the gifted digital media item.

18. The at least one non-transitory computer readable medium of claim 17, wherein the selected portion comprises a portion of playable media content from the digital media item selected on the first device.

19. The at least one non-transitory computer readable medium of claim 17, wherein the first user account is charged a fee for generating the gifted digital media item.

20. The at least one non-transitory computer readable medium of claim 17, further comprising instructions which when executed by the at least one processor, causes the at least one processor to receive a note that is associated with the digital media item, the note being generated by the first device.

21. The at least one non-transitory computer readable medium of claim 17, wherein personalizing the digital media item further comprising instructions which when executed by the at least one processor, causes the at least one processor to associate a dedication to the gifted digital media item, wherein the dedication is presented before presentation of the gifted digital media item.

22. The at least one non-transitory computer readable medium of claim 17, wherein the request includes a redemption code.

23. The at least one non-transitory computer readable medium of claim 17, further comprising instructions which when executed by the at least one processor, causes the at least one processor to:

receive a request from the second user account to gift the gifted digital media item to a third user account; and associate the gifted digital media item to the third user account in response to the request.

24. The at least one non-transitory computer readable medium of claim 17, wherein the personal message further includes a link to redeem the gifted digital media item.

* * * * *